United States Patent
Bucklew et al.

(10) Patent No.: US 11,329,730 B2
(45) Date of Patent: May 10, 2022

(54) QUANTUM COMMUNICATION SYSTEM HAVING TIME TO FREQUENCY CONVERSION AND ASSOCIATED METHODS

(71) Applicant: EAGLE TECHNOLOGY, LLC, Melbourne, FL (US)

(72) Inventors: Victor G. Bucklew, Colorado Springs, CO (US); Vivek Krishna, West Melbourne, FL (US); James A. Nagel, Fort Wayne, IN (US); Brent W. Plansinis, Saint Cloud, FL (US); Michael R. Lange, Melbourne, FL (US)

(73) Assignee: EAGLE TECHNOLOGY, LLC, Melbourne, FL (US)

(*) Notice: Subject to any disclaimer, the term of this patent is extended or adjusted under 35 U.S.C. 154(b) by 342 days.

(21) Appl. No.: 16/583,346

(22) Filed: Sep. 26, 2019

(65) Prior Publication Data
US 2021/0099236 A1 Apr. 1, 2021

(51) Int. Cl.
| H04B 10/70 | (2013.01) |
| G02F 1/35 | (2006.01) |
| H04L 9/08 | (2006.01) |
| G03H 1/02 | (2006.01) |

(52) U.S. Cl.
CPC .......... *H04B 10/70* (2013.01); *G02F 1/3534* (2013.01); *G03H 1/02* (2013.01); *H04L 9/0855* (2013.01); *G03H 2001/0224* (2013.01)

(58) Field of Classification Search
CPC .............................. H04B 10/70; G02F 1/3534
See application file for complete search history.

(56) References Cited

U.S. PATENT DOCUMENTS

| 7,831,049 B1 | 11/2010 | Kanter |
| 9,306,739 B1 | 4/2016 | Troupe |
| 9,634,770 B2 | 4/2017 | Dynes et al. |
| 11,050,559 B2 | 6/2021 | Bucklew et al. |
| 11,082,216 B2 | 8/2021 | Bucklew et al. |

(Continued)

FOREIGN PATENT DOCUMENTS

| EP | 3185463 | 6/2017 |
| WO | 2012044149 | 4/2012 |
| WO | 2012074369 | 6/2012 |

OTHER PUBLICATIONS

J. Nunn, L. J. Wright, C. Söller, L. Zhang, I. A. Walmsley, and B. J. Smith, "Large-alphabet time-frequency entangled quantum key distribution by means of time-to-frequency conversion," Opt. Express 21, 15959-15973; 2013 (Year: 2013).*

(Continued)

*Primary Examiner* — Nathan M Cors
(74) *Attorney, Agent, or Firm* — Allen, Dyer, Doppelt + Gilchrist, P.A.

(57) ABSTRACT

A quantum communications system may include a transmitter node, a receiver node, and a quantum communications channel coupling the transmitter node and receiver node. The receiver node may be configured to arrange a received bit stream of optical pulses from the transmitter node into time bins, convert the optical pulses in the time bins into corresponding optical pulses in frequency bins, and detect respective optical pulse values from each of the frequency bins.

22 Claims, 8 Drawing Sheets

(56) References Cited

U.S. PATENT DOCUMENTS

| | | | |
|---|---|---|---|
| 2003/0002674 | A1 | 1/2003 | Nambu et al. |
| 2007/0064945 | A1 | 3/2007 | Yuan et al. |
| 2008/0101612 | A1 | 5/2008 | Imai et al. |
| 2012/0177201 | A1 | 7/2012 | Ayling et al. |
| 2013/0016835 | A1 | 1/2013 | Zbinden et al. |
| 2016/0233964 | A1 | 8/2016 | Frohlich et al. |
| 2016/0234017 | A1 | 8/2016 | Englund et al. |
| 2016/0234018 | A1 | 8/2016 | Frohlich et al. |
| 2017/0019252 | A1* | 1/2017 | Bitauld .................. G02F 1/353 |
| 2018/0191496 | A1 | 7/2018 | Duplinskiy et al. |
| 2018/0198608 | A1 | 7/2018 | Nordholt et al. |
| 2018/0343116 | A1 | 11/2018 | Nordholt et al. |
| 2019/0323892 | A1 | 10/2019 | Ye et al. |
| 2020/0153619 | A1 | 5/2020 | Ribordy |
| 2020/0183250 | A1* | 6/2020 | Hall ........................ G02F 1/365 |
| 2020/0274701 | A1 | 8/2020 | Yuan et al. |

OTHER PUBLICATIONS

Donohue et al. "Coherent Ultrafast Measurement Of Time-Bin Encoded Photons." Physical Review Letters. vol. 11, Issue 15. 153602 (2013) pp. 153602-1-153602-5. (Year: 2013).*

Lavoie et al. "Spectral Compression Of Single Photons." Nature Photonics. vol. 7 (2013) 363-366. pp. 1-12. (Year: 2013).*

Bucklew et al., U.S. Appl. No. 16/658,398, filed Oct. 21, 2019, (cited application is stored in the the USPTO's IFW system).

Bucklew et al., U.S. Appl. No. 16/687,767, filed Nov. 19, 2019, cited application is stored in the the USPTO's IFW system).

Bucklew et al., U.S. Appl. No. 16/668,002, filed Oct. 30, 2019, (cited application is stored in the the USPTO's IFW system).

Bucklew et al., U.S. Appl. No. 16/668,025, filed Oct. 30, 2019, (cited application is stored in the the USPTO's IFW system).

Bucklew et al., U.S. Appl. No. 17/179,490, filed Feb. 2, 2021, (cited application is stored in the the USPTO's IFW system).

Barros et al.: "Free-Space Entangled Quantum Carpets," Arxiv.Org. Cornell University Library, 201 Olin Library Cornell University, Ithaca, NY, 14853, DOI: 10.1103/Physreva.95.042311, Feb. 23, 2017, pp. 1-10.

"Quantum Key Distribution; Components and Internal Interfaces," ETSI Draft, QKD05_11_Components_Interfaces, European Telecommunications Standards Institute (ETSI), 650, Route Des Lucioles, F-06921 Sophia-Antipolis, France, Oct. 14, 2009, pp. 1-24.

Farias et al.: "Quantum Information Processing by Weaving Quantum Talbot Carpets," Arxiv.Org. Cornell University Library, 201 Olin Library Cornell University, Ithaca, NY, 14853, DOI: 10.1103/Physreva.91.062328, Dec. 8, 2014 , pp. 1-11.

Islam et al."Provably Secure And High-Rate Quantum Key Distribution With Time-Bin Qudits." Science Advances. vol. 3 Issue 1. e1701491. (2017). pp. 1-7.

Lavoie et al. "Spectral Compression Of Single Photons." Nature Photon. vol. 7, Issue 5. (2013). pp. 1-12.

Li et al. "Spectral Compression Of Single-Photon-Level Laser Pulse." Scientific Reports. vol. 7. 43494. (2017) pp. 1-7.

Donohue et al. "Ultrafast Time-Division Demultiplexing Of Polarization-Entangled Photons." Physical Review Letters. vol. 113, Issue 16. 163602 (2014) pp. 1-11.

Donohue et al. "Coherent Ultrafast Measurement Of Time-Bin Encoded Photons." Physical Review Letters. vol. 111, Issue 15. 153602 (2013) pp. 153602-1-153602-5.

John Matthew Donohue. "Ultrafast Manipulation Of Single Photons Using Dispersion And Sum-Frequency Generation." Thesis presented to University of Waterloo, for Doctor of Philosophy in Physics (Quantum Information). Waterloo, Ontario, Canada, (2016) pp. 1-262.

Jason Scott Pelc. "Frequency Conversion Of Single Photons: Physics, Devices, And Applications." Dissertation submitted to Stanford University Department of Applied Physics, for Doctor of Philosophy. (2012) pp. 1-174.

Hannah E. Guilbert. "Efficient Entangled Biphoton Production And Manipulation For Quantum Applications." Dissertation submitted to Duke University, for Doctor of Philosophy in Physics. (2015) pp. 1-256.

Alexander Owen Clayton Davis. "Measurement Of Quantum Light Pulses For Enhanced Precision Sensing." Thesis submitted to Keble College, Oxford, UK, for Doctor of Philosophy. (2018) pp. 1-245.

Oliver T. Slattery. "Development Of Single-Photon Sources, Detectors, Spectrometers And Interfaces For Quantum Communication Systems." Thesis submitted to University of Limerick, Limerick, Ireland, for Doctor of Philosophy. (2015) pp. 1-301.

* cited by examiner

QUANTUM COMMUNICATION SYSTEM HAVING TIME TO FREQUENCY CONVERSION AND ASSOCIATED METHODS

FIELD OF THE INVENTION

The present invention relates to communication systems, and, more particularly, to quantum communication systems and related methods.

BACKGROUND OF THE INVENTION

In a quantum communication system, sometimes referred to as a quantum information system, information is exchanged between a transmitter node and a receiver node using encoded single photons. Each photon carries information that is encoded on a property of the photons, such as its polarization, phase, or energy in time. These systems generally require sending information from one node to another node, such as a transmitter node, usually referred to as "Alice," and a receiver node, usually referred to as "Bob." The term quantum communication system encompasses multiple applications. For example a quantum key distribution (QKD) system allows the sharing of cryptographic keys between the transmitter node and receiver node, thus allowing a more secure communication between the two parties. The QKD system provides a test whether any part of the key would be known to an unauthorized third party eavesdropper, usually referred to as "Eve." Other applications of a quantum communication system includes quantum random number generator (QRNG) systems that use the inherent indeterminacy of quantum entangled photons to produce random binary digits, and quantum secured direct communication (QSDC) systems that transfer direct information without a distribution key. Instead, quantum photons are generated that carry secure quantum information, which is decoded upon receipt at the receiver node.

At the receiver node, single photon detectors are often used to detect each single photon as a photon is transmitted along the quantum communications channel to the receiver node. Single photon detectors, however, usually have long recovery or reset times, corresponding to what many skilled in the art refer to as the detector's "dead time." The fastest single photon detectors usually have a recovery or reset time of about 100 picoseconds (ps), which limits the data speeds that may be applied in quantum communication systems. Because single or few photon sources are used in quantum communication systems involving secure communications, as a result, the achievable communication speeds at the single photon level may be limited to about 1 Gigahertz (GHz). For instance, some random number generators often require 10s of Gigahertz (GHz) generation rates, and quantum key distribution protocols can be limited to 100s of MHz or lower rates once the system as a whole is considered. For quantum communication systems to be more readily accepted and used in place of classical techniques of conventional communications, which can operate at terahertz (THz) speeds, the quantum communications system may require higher rates than currently available in many systems. The direct detection of high-speed single photon data streams in quantum communication systems are thus limited by the detector recovery or reset time, e.g., the detector's "dead time."

SUMMARY OF THE INVENTION

In general, a quantum communications system may include a communications system operable with a quantum key distribution (QKD) system, which includes a transmitter node, a receiver node, and a quantum communications channel coupling the transmitter node and receiver node. The receiver node may be configured to arrange a received bit stream of optical pulses from the transmitter node into time bins, convert the optical pulses in the time bins into corresponding optical pulses in frequency bins, and detect respective optical pulse values from each of the frequency bins.

The receiver node may comprise a sum-frequency generation (SFG) device configured to convert the optical pulses in the time bins into corresponding optical pulses in frequency bins by performing an SFG process on the received bit stream of optical pulses and an optical chirp signal to produce an optical sum signal. The receiver node may comprise a spectral compression device to convert the optical pulses in the time bins into corresponding optical pulses in frequency bins by performing a spectral compression on the optical sum signal. The receiver node may also comprise a grating and a plurality of optical detectors coupled thereto to detect the respective optical pulse values. Each of the plurality of optical detectors may comprise a single photon detector.

The transmitter node may comprise a laser pulse source, a spatial light modulator (SLM) coupled downstream from the laser pulse source, and a waveguide array coupled downstream from the SLM. In one embodiment, the quantum communications channel may comprise a free-space optical communications channel. In another embodiment, the quantum communications channel may comprise a fiber optic communications channel.

In another example, a receiver node for a system may include a transmitter node, and a communications channel coupling the transmitter node and receiver node. The receiver node may comprise Opto-Electronic (OE) circuitry configured to arrange a received bit stream of optical pulses from the transmitter node into time bins, convert the optical pulses in the time bins into corresponding optical pulses in frequency bins, and detect respective optical pulse values from each of the frequency bins.

Another aspect is directed to a method for operating a quantum communications system that may comprise a communications system and a quantum key distribution (QKD) system operable therewith. The QKD system may comprise a transmitter node, a receiver node, and a quantum communications channel coupling the transmitter node and receiver node. The method may comprise operating the receiver node to arrange a received bit stream of optical pulses from the transmitter node into time bins, convert the optical pulses in the time bins into corresponding optical pulses in frequency bins, and detect respective optical pulse values from each of the frequency bins.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete.

Figure 1:
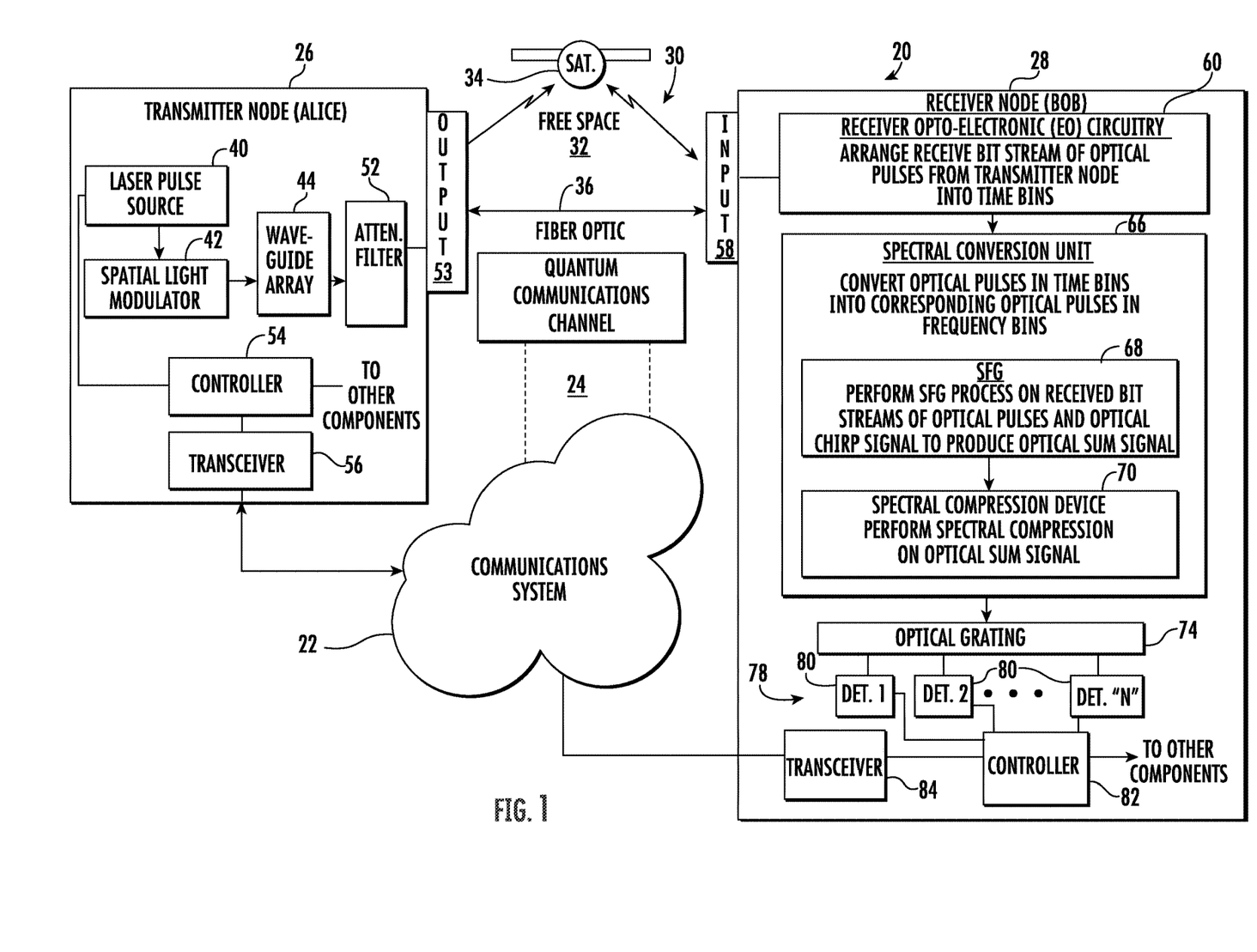
FIG. 1 is a block diagram of the quantum communications system according to the invention.

Referring initially to FIG. 1, a quantum communication system is illustrated generally at 20. This system 20 is described relative to the components of FIG. 1 that form a quantum key distribution (QKD) system as will be explained in greater detail below. However, the system includes time-to-frequency conversion that may be employed with many different quantum communication systems, also referred to as quantum information system, such as quantum random number generator (QRNG) systems and quantum secured direct communication (QSDC) systems. The system 20 in this example includes a communications system 22 as a non-quantum communications system and a quantum key distribution (QKD) system 24 operable with the communication system, for example, a classical and quantum communication sub-system when a QRNG or QSCD system is used. As illustrated, the system 20 and in this example the QKD system 24 includes a transmitter node 26, a receiver node 28, and a quantum communications channel 30 coupling the transmitter node and receiver node. In an example, the quantum communications channel 30 may be a free-space optical communications channel indicated at 32, such as point-to-point, or using a satellite 34, or the quantum communications channel may be a fiber optic communications channel indicated at 36. The transmitter node 26 not only communicates with the receiver node 28 over the quantum communications channel 30, but also communicates via the communications system 22, which may include a non-quantum or conventional communications channel and may be fiber optic, free-space, wired, or another communications channel. The quantum communications channel 30 may be part of the communication system 22 as indicated by the dashed lines connecting the two, indicating that both the quantum communications and non-quantum communications may be transmitted over a fiber optic communications channel or over a free-space optical communications channel that is part of the communications system 22.

When describing a quantum communication systems 20, the transmitter node 26 is usually referred to as "Alice" and the receiver node 28 is usually referred to "Bob." Any eavesdropper on the quantum communications system 20 is usually referred to as "Eve." The transmitter node 26 includes a laser pulse source 40 (FIGS. 1 and 2) for generating a bit stream of optical pulses. Although a laser pulse source 40 is described, it should be understood that other sources may possibly be used that generate the bit stream of optical pulses. It is possible depending on system design for one or more light emitting diodes (LED's) to be used to generate the bit stream of optical pulses. A spatial light modulator (SLM) 42 is coupled downstream from the laser pulse source 40 and receives the bit stream of optical pulses emitted generally by the laser pulse source. The SLM 42 imposes a spatially varying modulation on the beam of light such as by modulating the intensity of the light beam, and in some cases, the phase of the beam or both, for example, the intensity and phase simultaneously. A waveguide array 46 is coupled downstream from the SLM 42 in an embodiment, and in operation with the SLM, increases the random state, bit generation at the front end of the transmitter node 26 that helps enable time to frequency conversion at the receiver node 28, as explained in greater detail below.

The SLM 42 is usually operative to adjust phase and amplitude, and is preloaded with random configurations for generating time bin states or bit values for communications, which are imparted onto the laser pulse. The SLM 42 may also generate phase bin states. The optical pulses may be parallelized into time bins based on coupling into the waveguide array 46 as shown in greater detail in FIG. 3, where different optical light waveguides 48 are arranged in parallel at the waveguide array, such that the output bit stream is increased in a rate proportional to the number of optical light waveguides in the array. The output bit stream is shown by the optical arrows and pulses as dashes at 50, and the schematic illustrates the various pulses as on and off and indicated at 51 at the input to the waveguide array 46. An attenuation filter 52 (FIGS. 1 and 2) may be operative with the waveguide array 46 and operate in a spectral region over which low transmission of optical pulses is required such that the optical pulse output 53 from the transmitter node 26 is an output bit stream of single photons that are encoded bit values.

The transmitter node 26 includes a controller 54 operatively connected to the laser pulse source 40 and other components for controlling their operation, such that the laser pulse source and SLM 42 and other components at the transmitter node 26 are controlled for transmitting a single photon in a polarization state defined by the bit and basis, and record the time the photon was transmitted. This process is repeated for the string of bits as single photons. The transmitter node may include a transceiver 56 connected to the controller 54 and operative to communicate with the receiver node 28 via the communications system 22 using, for example, an unencrypted non-quantum communications channel for the key exchange or key sifting process as the key exchange is commonly called.

The transmitter node 26 transmits the bit stream of optical pulses over the quantum communications channel 30, which as noted above, could be a free-space optical communications channel 32 via satellite 34 or point-to-point, or a fiber optic communications channel 36, and either separate or a part of the communications system 22. It is possible to use the same optical fiber for both quantum communications and conventional communications for key exchange, such as unencrypted communications used in key sifting.

The receiver node 28 receives the bit stream of optical pulses at its input 58 and into receiver optics 60 (FIG. 1) and any associated mechanical or electronic components that are configured to arrange the received bit stream of optical pulses originally transmitted from the transmitter node 26 into time bins, such as one or more time bins with similar or varying phase values. The receiver Opto-Electronic (OE) circuitry 60 in an example may include a beam splitter 62 (FIG. 2), which is operative to split the incoming optical pulse stream for time processing and phase processing. The quantum communications system 20 as described operates to minimize bin sizes to durations shorter than the "dead time" or recovery time associated with a single photon detector using sum-frequency generation (SFG) and spectral compression as explained in greater detail below. However, it is possible that part of the beam could be split via a beam splitter 62 into an interferometer for phase detection, which may include a waveguide with two detectors for the phase detection, as shown at 64 in the block labeled interferometer/phase detection in FIG. 2. Phase detection may include detecting the phase from different interferometers, where the highest peak intensity represents encoded information. This can be followed by spectral conversion and detectors in parallel to increase the key rate as shown at block 65. Both time and phase detection systems can make use of the time-to-frequency conversion. At this phase detection side, phase states are run through interferometers, which separate the phase states into time. Those time states can be spectrally converted and detected with an array of detectors.

Once the optical pulses are received at the receiver node 28 and arranged in the time bins, they are received within a spectral conversion unit 66, which converts the optical pulses in the time bins into corresponding optical pulses in frequency bins. In the example of FIG. 1, the spectrum conversion unit 66 includes a sum-frequency generation (SFG) device 68 configured to convert the optical pulses in the time bins into corresponding optical pulses in frequency bins by performing an SFG process on the received bit stream of optical pulses and an optical chirp signal to produce an optical sum signal.

The sum-frequency generation 68 occurs with an optical chirp signal as a chirped classical pump pulse with temporal width equal to or less than the recovery or "dead time" of the optical detectors. The temporal width is designed to convert the time bins to frequency bins and allow uninterrupted detection of single photons while using optical detectors with dead times much longer than the separation between adjacent single photons. For example, if the chirped pump pulses are designed so that they are the same temporal width as the detector dead time, and if they are positioned one after the other, without any temporal gap, than the ability to convert time bins to frequency bins is achieved without interruption due to slow detection. The sum-frequency generation device 68 may operate where two pump beams may generate another beam with the sum or difference of the optical frequencies of the pump beams. The received bit stream of optical pulses as a beam is processed with the optical chirp signal to generate a beam with the sum or difference of the optical frequencies as a second order non-linear optical process, such as by annihilating two input photons at the different angle or frequencies while generating another photon at a different frequency.

A spectral compression device 70 receives the signal from the SFG device 68 and performs spectral compression on the optical sum signal. In this example, the spectral compression device 70 may reduce the bandwidth of the frequency binned photons either in parallel or series with the sum frequency device. The bit value may be compressed in frequency so that it is less than the frequency bin size. By pre-chirping the single photons and using cross-phase modulation with a strong pump, spectral compression occurs and reduces the overlap between pulses so that the time period as Tau ($\tau$) may be decreased. With the lowered time period, the overall bit rate is increased.

To increase the bit rate of the system 20, time bins with smaller time windows such as 400 picoseconds (ps) to 0.5 ps may be used to send more bits within a given time. A shorter pulse width, however, may cause the frequency domain of the pulse to be more spread and the neighboring bin spectrums may overlap. The use of the sum-frequency generation device 68 in operation with the spectral compression device 70 helps to separate the spectrums. Further details of spectral compression may be found in the article by Lavoie et al. entitled, "Spectral Compression of Single Photons," Nature Photonics, Volume 7, Issue 5, pp. 363-366 (2013), the disclosure which is hereby incorporated by reference in its entirety.

Figure 2:
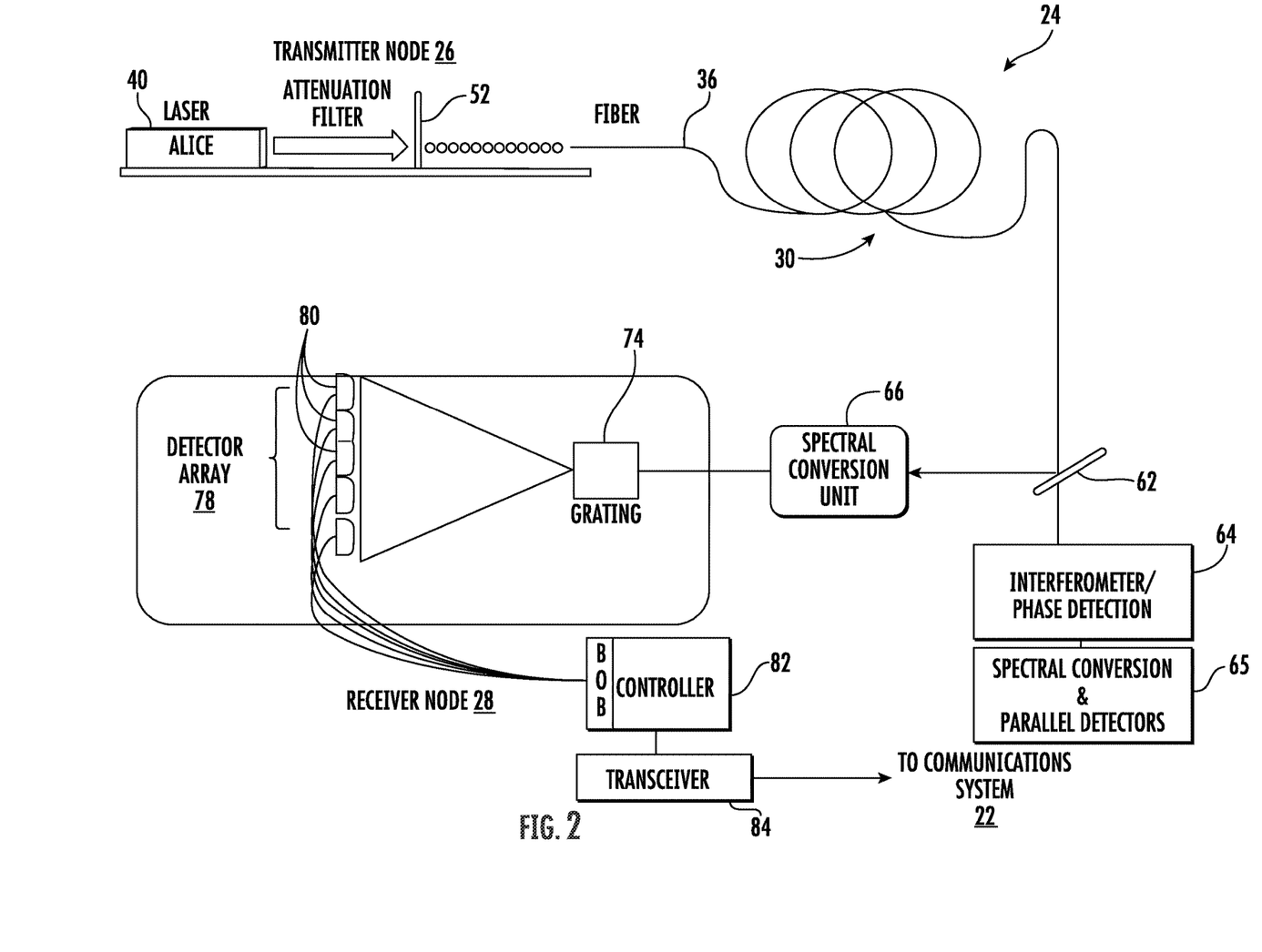
FIG. 2 is a schematic block diagram of major components of the quantum communications system of FIG. 1.
Figure 3:
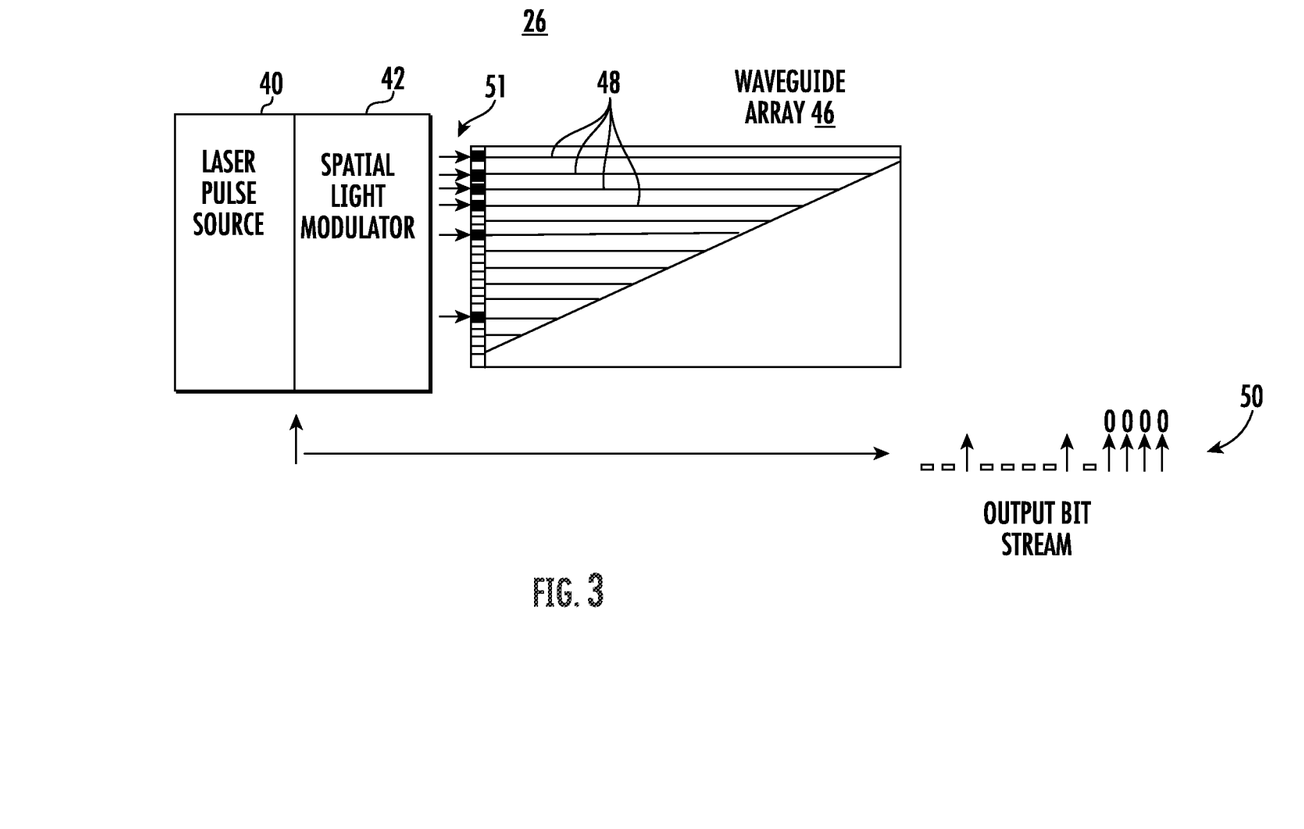
FIG. 3 is a schematic block diagram of major components in the transmitter node of the quantum communications system of FIG. 1.

After spectral compression, the signal passes through an optical grating 74, which separates the different bit values and frequencies spatially for detection of the respective optical pulse values, as best shown in FIGS. 1 and 2, showing the optical grating, followed by a detector array indicated generally at 78, and formed as a plurality of optical detectors 80, each which may be formed as a single photon detector. Each of the plurality of optical detectors as a single photon detector 80, in an example, are operatively connected to a controller 82 and conventional transceiver 84 located at the receiver node 28. The optical detectors 80 detect the respective optical pulse values from each of the frequency bins, e.g., spatially separated optical frequency bin values. The transceiver 84 located at the receiver node 28 may communicate via the conventional communications system 22 with the conventional transceiver 56 located at the transmitter node 26. Bob as party at the receiver node 28 may communicate with the transmitter node 26, e.g., Alice. System calibration enables the detection of a single photon on any one of the optical detectors 80 in the array to be mapped to an initial value of temporal bin value.

Figure 4:
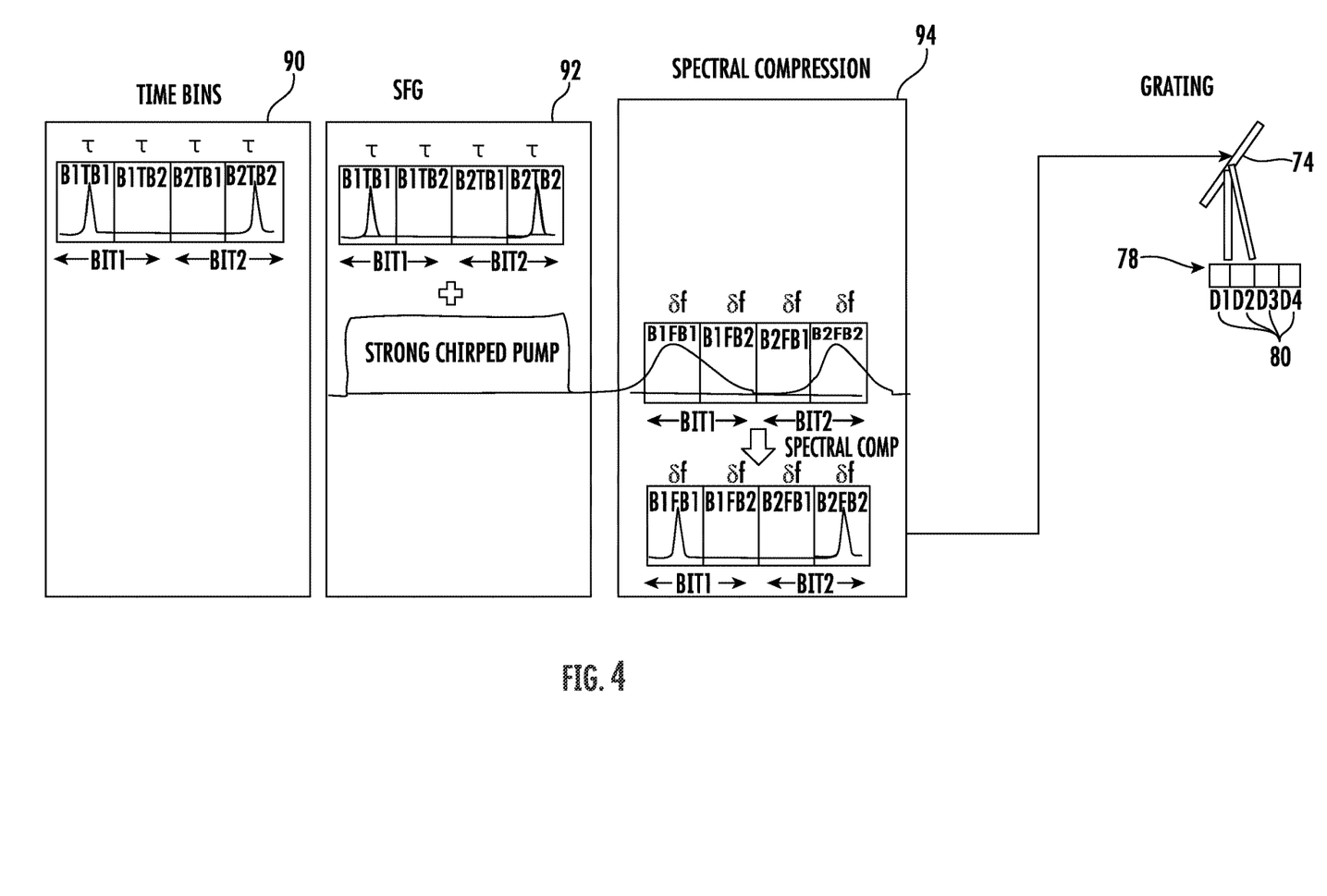
FIG. 4 is a schematic block diagram showing respective time and frequency bins at the receiver node of the quantum communications system of FIG. 1.

Referring now to FIG. 4, there is illustrated in greater detail the time and frequency bins for purposes of explanation. Optical pulses are received within the receiver node 28 with Bit 1 and Bit 2 corresponding to two time periods of pulses of width two Tau ($2\tau$). Each bit spans the two-time bins ($2\tau$) as shown by B1TB1 and B1TB2, corresponding to the first Bit 1 with Time Bin 1 and Time Bin 2, B2TB1 and B2TB2 for Bit 2. These time bins are shown in the block labeled Time Bins at 90. The SFG device 68 performs the SFG with a chirp signal as a chirped classical pump such that a bit value in time is linked to a bit value in frequency. The result is the signal that spreads over time and forms the extended waveform over Bit 1 and Bit 2 as illustrated in the block labeled SFG at 92. The spectral compression device 70 will squeeze the bit value and frequency to match the frequency bin size as illustrated in the block labeled Spectral Compression at 94. The grating 74 separates the different bit values and frequencies spatially for detection by the detector array 78 forming in this example as a plurality of optical detectors 80, each as a single photon detector. The controller 82 at the receiver node 28 (FIG. 1) maintains track of how each frequency bin is translated to the original time bin. Thus, the controller 82 processes data and correlates when a photon in a particular frequency bin corresponding to a photon in a particular time bin.

Figure 5:
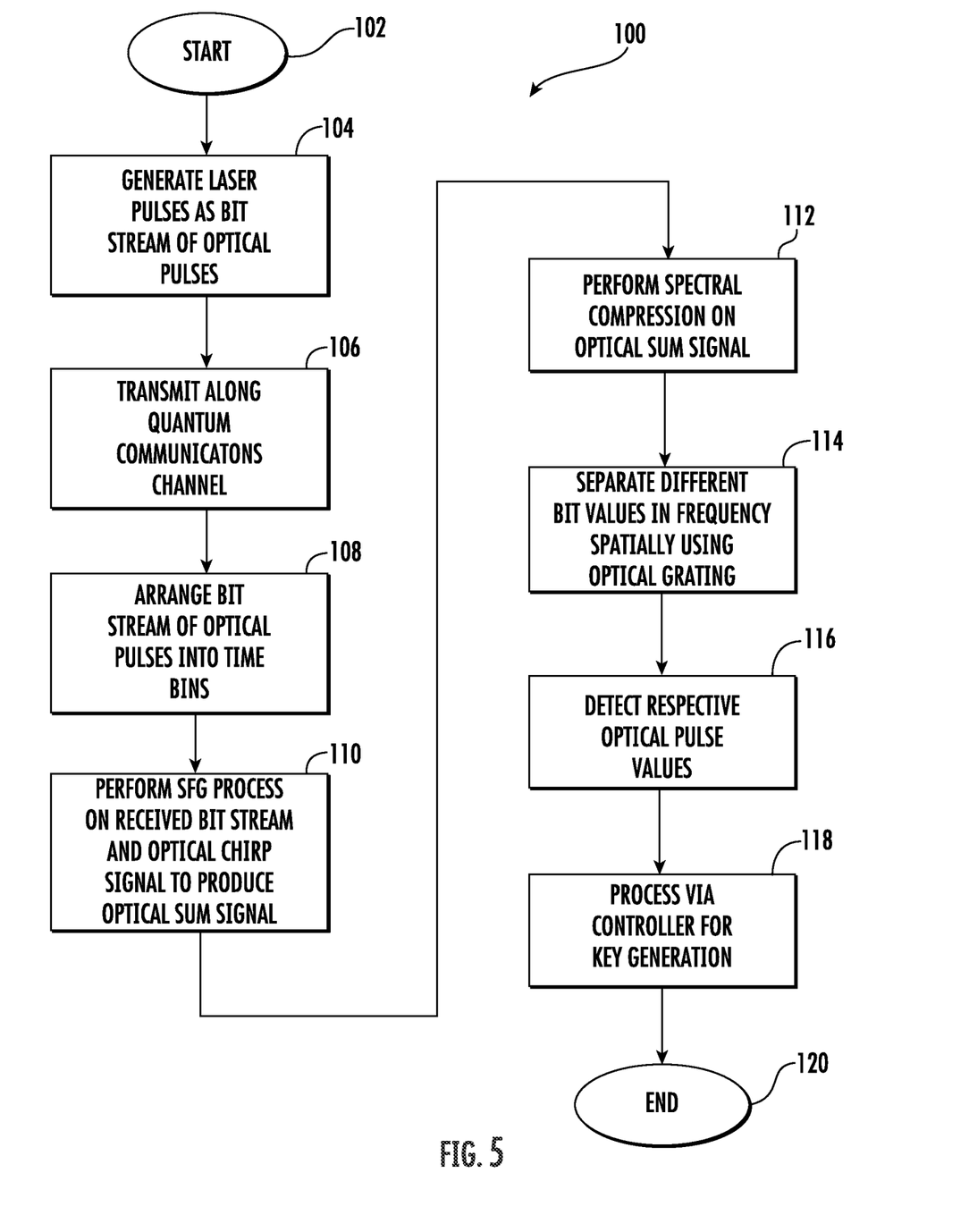
FIG. 5 is a high-level flowchart of a method for operating the quantum communications system of FIG. 1.

A flowchart illustrating the method of operating the quantum communications system 20 is illustrated at 100. The process starts (Block 102) and the laser pulse source 40 generates a bit stream of optical pulses (Block 104) and transmits the bit stream of optical pulses along the quantum communications channel (Block 106) to the receiver node 28. The generation of the bit stream of optical pulses may include the optical processing via the spatial light modulator 42, the waveguide array 46 and attenuation filter 52 as described above. The receiver node 28 arranges the received bit stream of optical pulses from the transmitter node 26 into time bins (Block 108) and the SFG device 68 performs an SFG process on the received bit stream of optical pulses and an optical chirp signal to produce the optical sum signal (Block 110). The spectral compression device 70 performs a spectral compression on the optical sum signal (Block 112) and the optical grating 74 separates the different bit values in frequency spatially for detection (Block 114). The optical detectors 80 detect respective optical pulse values (Block 116). Further processing may occur via the controller 82 for key generation (Block 118) and the process ends (Block 120).

It is possible that the quantum communications system 20 can be implemented as a one frequency conversion unit or have stages stacked one after the other to increase the overall efficiency of the quantum communications system 20, especially for applications involving direct detection of quantum data as opposed to random data streams for QKD. The efficiency of the quantum communications system 20 for time bin detection may be determined by efficiency in: the receiver optics 60, which may include a beam splitter 62; the optical fiber; the SFG device 68; the spectral compression device 70; the optical grating 74; and the optical detectors 80 in terms of quantum efficiency. An example system efficiency based on experimental results is shown in the chart below.

| Source | Percentage Kept |
| --- | --- |
| 90/10 Beam Splitter for Detection | 90% |
| Fiber Transmission (20 km) | 44% |
| | loss of 0.18 dB/km |
| SFG Efficiency | 60% |
| Grating Efficiency | 93% |
| Detector Efficiency | 60% |
| System Efficiency (at 20 km) | 13% |

Figure 6:
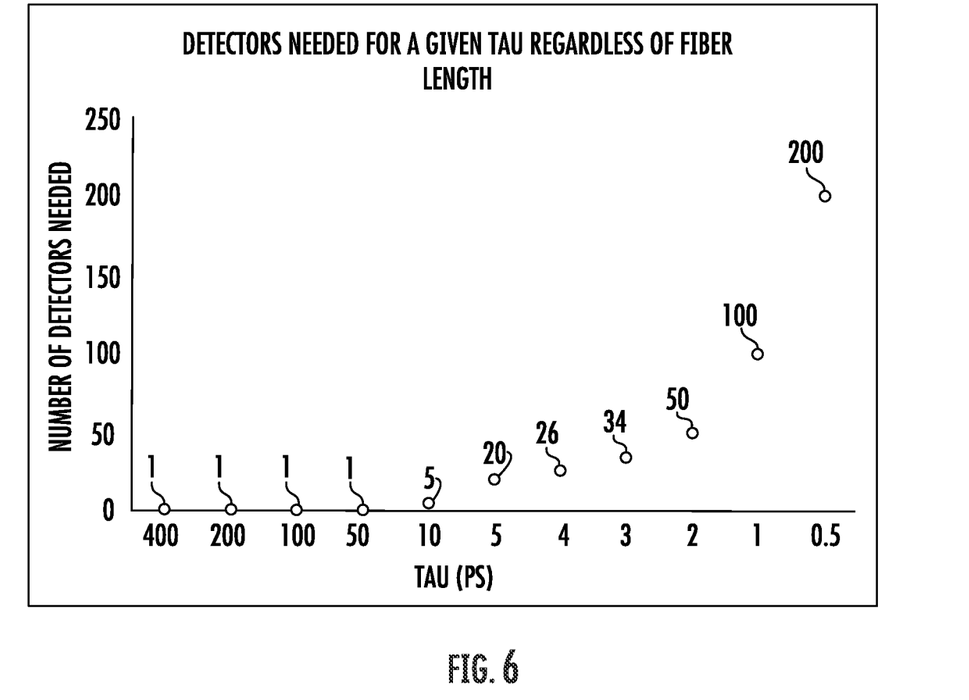
FIG. 6 is a graph showing the number of optical detectors required at the receiver node for a given time period.

Referring now to FIG. 6, there is illustrated a graph showing an example of the number of optical detectors 80 that may be required for a given time period ($\tau$) Tau in picoseconds regardless of fiber length. The number of optical detectors 80 in this example may be determined by dividing the detector recovery time, e.g., the detector "dead time" as in an example 100 picoseconds (ps), by 2 Tau ($\tau$) as a single bit is 2 time bins. The quantum communications system 20 removes the bottle neck of the "dead time" because as one optical detector 80 is recovering, the next optical detector is ready to receive. This is dependent on the chirped pulse pump for the SFG device 68 as the duration of the "dead time" for an optical detector 80. The graph clearly shows that for a very short time period around 0.5 to 5 picoseconds, a greater number of optical detectors 80 is required.

Figure 7:
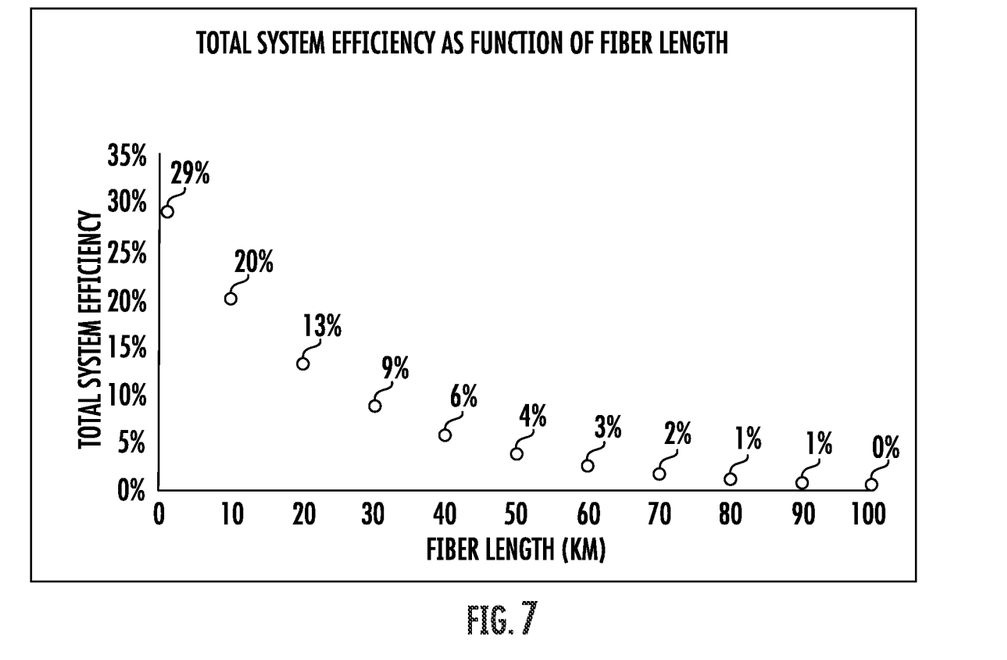
FIG. 7 is a graph showing the efficiency of the quantum communications system as a function of fiber length.

Referring now to FIG. 7, there is illustrated a graph showing the total system efficiency as a function of fiber length, illustrating in an example 20 km of fiber length having about 13% efficiency. As improvements are made in optical transmission, optical fibers, and design characteristics, this efficiency will increase. Thus, in this experiment to obtain a value for efficiency, performance was more limited at about 80 km of fiber length, but as technology improves, so will the efficiency.

Figure 8:
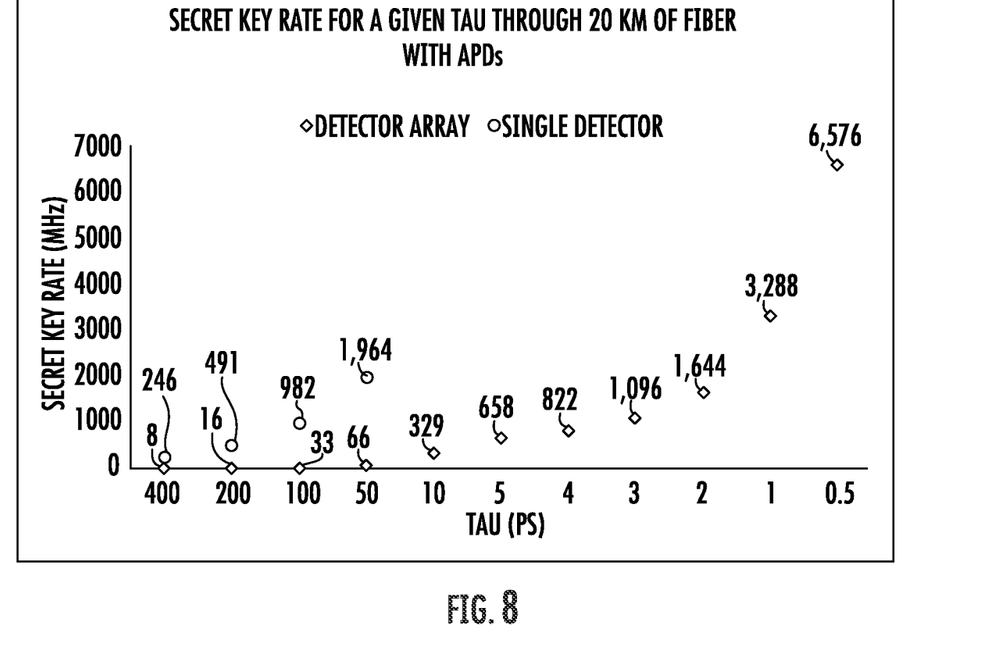
FIG. 8 is a graph showing the secret key rate for a given time period through 20 km of fiber.
Figure 9:
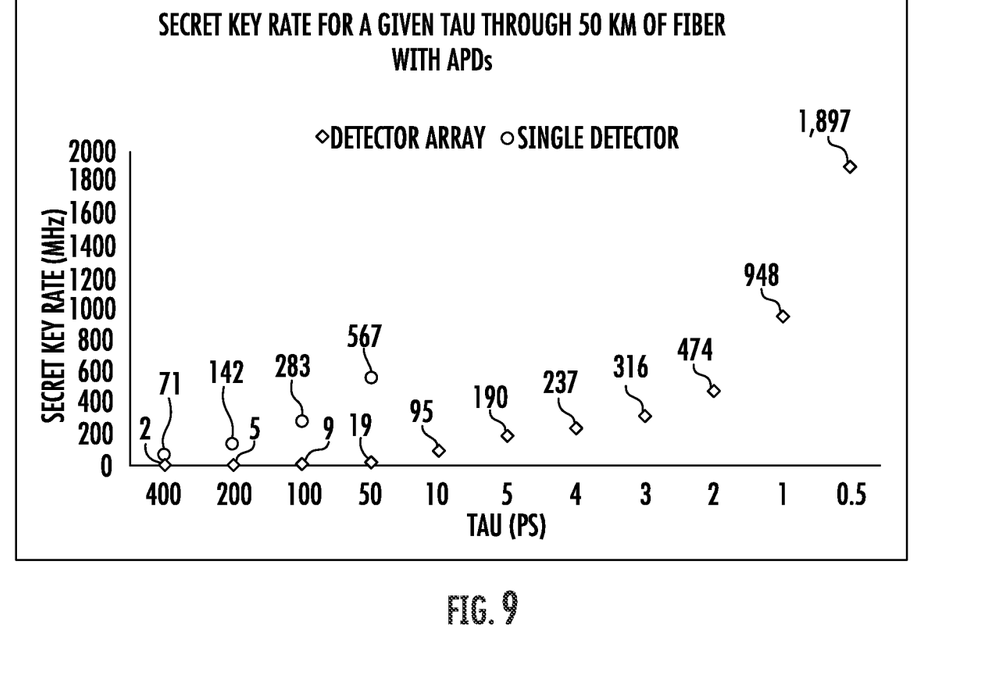
FIG. 9 is another graph similar to FIG. 8 but for the secret key rate through 50 km of fiber.

Referring now to FIGS. 8 and 9, there are illustrated graphs showing a secret key rate for a given Tau ($\tau$) through 20 km of fiber using avalanche photo diodes (APD's) and showing results where a detector array 78 is shown by a diamond and a single optical detector 80 is shown by the small circle. The graph In FIG. 8 shows the results for 20 km of optical fiber and the graph in FIG. 9 shows the results for 50 km of optical fiber. In one experiment, it was found that the secret key rate can be more than triple that of a single optical detector 80 using the detector array 78 as described above.

Figure 10:
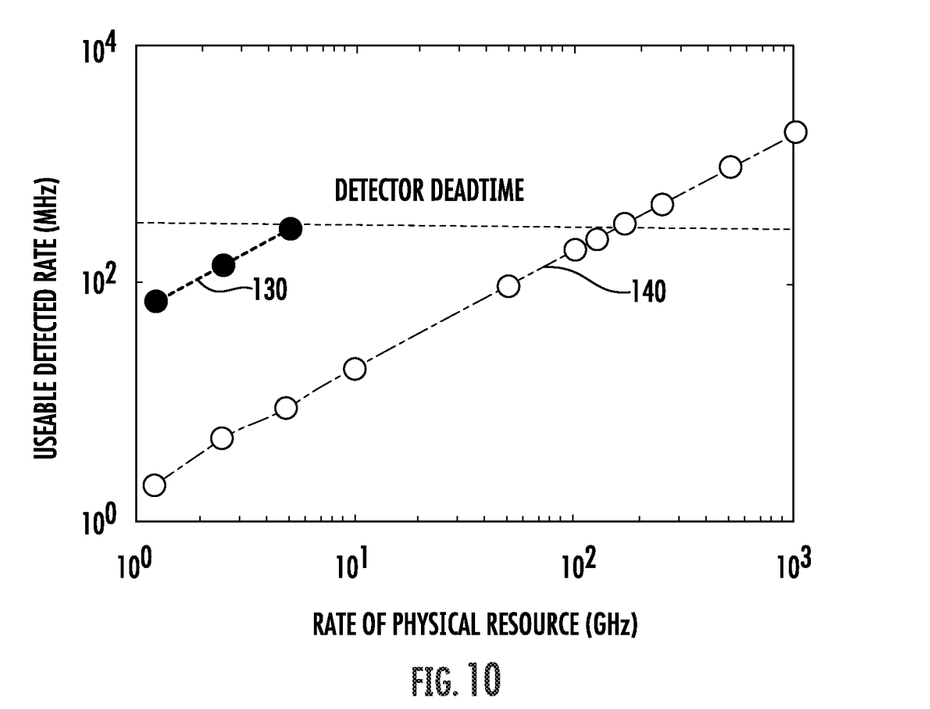
FIG. 10 is a graph showing the increase in detection rate using the quantum communications system of FIG. 1.

Referring now to FIG. 10, there is illustrated a graph showing the detector "dead time" and useable detected rate in MHz relative to the rate of physical resource in GHz for a conventional system shown by the line at 130 and the quantum communications system 20 as described shown by the line at 140. The larger black circles on each line 130,140 represent measurement points.

The quantum communications system 20 as described will increase the bit speeds using non-linear photonics and detector arrays and may be applied to random bit streams such as a random number generator and the quantum key distribution with one or more spectral conversion units 66 as described. Multiple spectral conversion units 66 may be placed in series, one after the other. It is possible to use the quantum communications system 20 as an add-on module before an optical detection stage and prepare and measure for QKD (Quantum Key Distribution) and QRNG (Quantum Random Number Generator) applications to increase overall system performance, or as multiple modules placed in series, one after the other, in order to increase the system performance for QSDC (Quantum Secured Direct Communication) technologies.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A quantum communications system comprising:
    a communications system; and
    a quantum key distribution (QKD) system operable with the communications system and comprising a transmitter node, a receiver node, and a quantum communications channel coupling the transmitter node and receiver node;
    the receiver node configured to
        arrange a received bit stream of optical pulses from the transmitter node into time bins,
        convert the optical pulses in the time bins into corresponding optical pulses in frequency bins, and
        detect respective optical pulse values from each of the frequency bins.

2. The quantum communications system of claim 1 wherein the receiver node comprises a sum-frequency generation (SFG) device configured to convert the optical pulses in the time bins into corresponding optical pulses in frequency bins by performing an SFG process on the received bit stream of optical pulses and an optical chirp signal to produce an optical sum signal.

3. The quantum communications system of claim 2 wherein the receiver node comprises a spectral compression device to convert the optical pulses in the time bins into corresponding optical pulses in frequency bins by performing a spectral compression on the optical sum signal.

4. The quantum communications system of claim 1 wherein the receiver node comprises a grating and a plurality of optical detectors coupled thereto to detect the respective optical pulse values.

5. The quantum communications system of claim 4 wherein each of the plurality of optical detectors comprises a single photon detector.

6. The quantum communications system of claim 1 wherein the transmitter node comprises:
- a laser pulse source;
- a spatial light modulator (SLM) coupled downstream from the laser pulse source; and
- a waveguide array coupled downstream from said SLM.

7. The quantum communications system of claim 1 wherein the quantum communications channel comprises a free-space optical communications channel.

8. The quantum communications system of claim 1 wherein the quantum communications channel comprises a fiber optic communications channel.

9. A receiver node for a system comprising a transmitter node, and a communications channel coupling the transmitter node and receiver node, the receiver node comprising:
- Opto-Electronic (OE) circuitry configured to
  - arrange a received bit stream of optical pulses from the transmitter node into time bins,
  - convert the optical pulses in the time bins into corresponding optical pulses in frequency bins, and
  - detect respective optical pulse values from each of the frequency bins.

10. The receiver node of claim 9 wherein the OE circuitry comprises a sum-frequency generation (SFG) device configured to convert the optical pulses in the time bins into corresponding optical pulses in frequency bins by performing an SFG process on the received bit stream of optical pulses and an optical chirp signal to produce an optical sum signal.

11. The receiver node of claim 10 wherein the OE circuitry comprises a spectral compression device to convert the optical pulses in the time bins into corresponding optical pulses in the frequency bins by performing a spectral compression on the optical sum signal.

12. The receiver node of claim 9 wherein the OE circuitry comprises a grating and plurality of optical detectors coupled thereto to detect the optical pulse values.

13. The receiver node of claim 12 wherein each of the plurality of optical detectors comprises a single photon detector.

14. The receiver node of claim 9 comprising a transceiver configured to connect to a communications system and communicate with the transmitter node about a quantum state of each received optical pulse.

15. A method of operating a quantum communications system comprising a communications system and a quantum key distribution (QKD) system operable therewith, the QKD system comprising a transmitter node, a receiver node, and a quantum communications channel coupling the transmitter node and receiver node, the method comprising:
- operating the receiver node to
  - arrange a received bit stream of optical pulses from the transmitter node into time bins,
  - convert the optical pulses in the time bins into corresponding optical pulses in frequency bins, and
  - detect respective optical pulse values from each of the frequency bins.

16. The method of claim 15 wherein operating the receiver node comprises converting the optical pulses in the time bins into corresponding optical pulses in frequency bins by performing a sum-frequency generation (SFG) process on the received bit stream of optical pulses and an optical chirp signal to produce an optical sum signal.

17. The method of claim 16 wherein operating the receiver node comprises converting the optical pulses in the time bins into corresponding optical pulses in frequency bins by performing a spectral compression on the optical sum signal.

18. The method of claim 15 wherein the receiver node comprises a grating and a plurality of optical detectors coupled thereto to detect the respective optical pulse values.

19. The method of claim 18 wherein each of the plurality of optical detectors comprises a single photon detector.

20. The method of claim 15 wherein the transmitter node comprises:
- a laser pulse source;
- a spatial light modulator (SLM) coupled downstream from the laser pulse source; and
- a waveguide array coupled downstream from said SLM.

21. The method of claim 15 wherein the quantum communications channel comprises a free-space optical communications channel.

22. The method of claim 15 wherein the quantum communications channel comprises a fiber optic communications channel.

* * * * *